June 4, 1968 A. LENDER 3,387,220

APARATUS AND METHOD FOR SYNCHRONOUSLY DEMODULATING FREQUENCY MODULATED DIFFERENTIALLY COHERENT DUOBINARY SIGNALS

Filed Feb. 23, 1965

INVENTOR.
ADAM LENDER

BY

Lippincott, Ralls & Hendricson
ATTORNEYS

United States Patent Office 3,387,220

Patented June 4, 1968

3,387,220
APPARATUS AND METHOD FOR SYNCHRONOUSLY DEMODULATING FREQUENCY MODULATED DIFFERENTIALLY COHERENT DUOBINARY SIGNALS

Adam Lender, Palo Alto, Calif., assignor, by mesne assignments, to Automatic Electric Laboratories, Inc., Northlake, Ill., a corporation of Delaware Filed Feb. 23, 1965, Ser. No. 434,595
8 Claims. (Cl. 329—104)

ABSTRACT OF THE DISCLOSURE

This invention relates generally to synchronous frequency modulated duobinary signals, and is more particularly directed to the coherent demodulation or detection of these signals to obtain the original digital data. Method and apparatus for such demodulation or detection includes delaying of such signals by one bit interval, producing the product of the delayed signal and undelayed signal, and low-pass filtering of such product to remove high-frequency components with the resultant then being sampled at bit intervals to produce original binary signals from which the synchronous frequency-modulated duobinary signals were generated.

Figure 1:
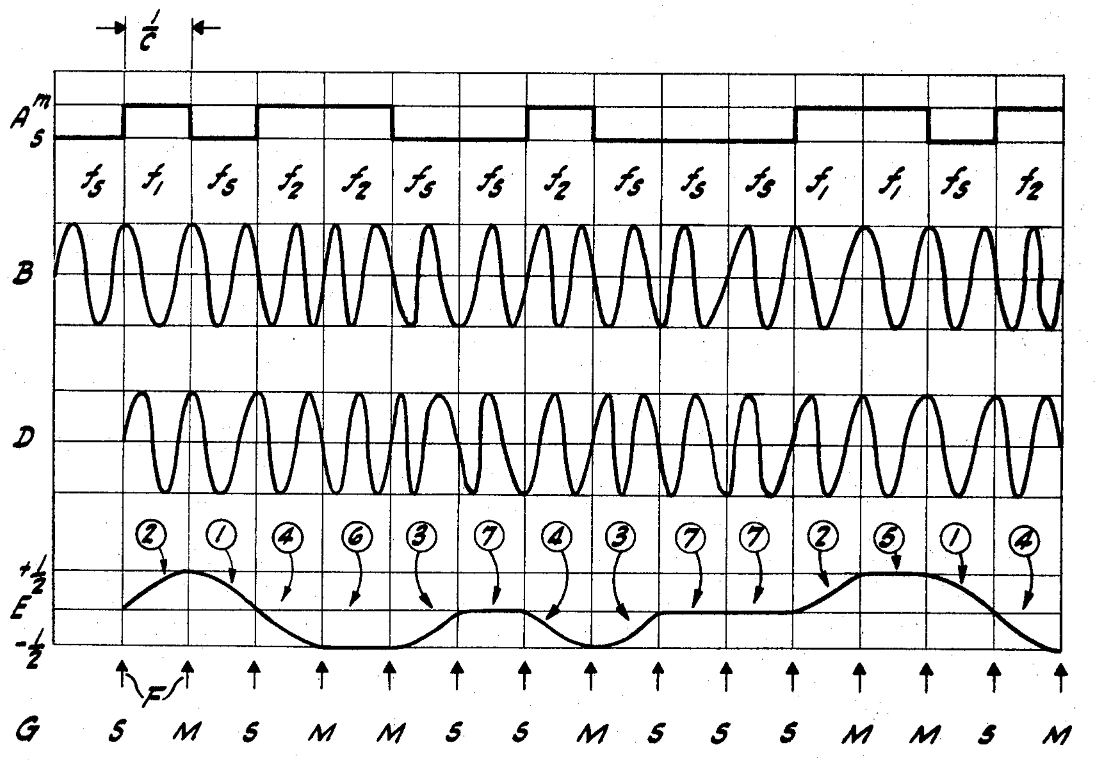

In the transmission of digital data consisting of a series of pulses of two discrete amplitude levels respectively representing, for example, "mark" and "space" conditions, a duobinary mode of processing the data is frequently employed because of the many advantages thereof. In particular, the rate of data transmission may be twice the rate previously thought to be the maximum rate established by Nyquist's Rule. It is additionally advantageous to employ synchronous frequency modulation in the transmission of the duobinary data. In this regard, reference may be had to my copending application Serial No. 434,583, filed in the U.S. Patent Office on Feb. 13, 1964, for details of the manner in which a synchronous frequency modulated duobinary signal is generated for transmission over a communications medium, and the advantages attending such mode of transmission. Basically, the synchronous frequency modulated signal contains three distinguishable frequencies which may appear in each bit time slot or interval of the original data. A center frequency is symmetrically disposed between an upper frequency and a lower frequency, the center frequency being indicative of one amplitude condition of the original data, e.g., "SPACE," and the two extreme upper and lower frequencies being indicative of the other amplitude condition thereof, e.g., "MARK." Accordingly, it will be appreciated that the original data may be readily reconstructed at the receiving end of the transmission system by means of a discriminator, axis-crossing detector, or other conventional frequency modulation device. Such devices are capable of producing an output signal which varies between two amplitude levels respectively representative in the foregoing case of "SPACE" and "MARK" conditions in response respectively to the center frequency and two extreme frequencies of the incoming signal. Unfortunately, these conventional frequency modulation detector devices have a threshold level below which the intelligence carried by an incoming signal is multilated and cannot be reliably recovered. In other words, for poor signal-to-noise ratio, the data recovered from an incoming signal is noncoherent with the original data transmitted.

It is therefore an object of the present invention to provide for the coherent demodulation of synchronous frequency modulated duobinary signals irrespective of the signal-to-noise ratio thereof.

Another object of the invention is the provision of a method and apparatus for detecting synchronous frequency modulated duobinary signals by observation of the phases of the signal at the transition points between the bit time slots thereof.

Still another object of the invention is to provide a system for the coherent detection of synchronous frequency modulated duobinary signals wherein the number of fractional cycles of incoming signal in each digit or time slot is compared to the number of fractional cycles in the previous digit as a criterion for determining which of the two discrete levels of the original data exists in the respective digits.

It is a further object of the invention to provide for the coherent demodulation of synchronous frequency modulated duobinary data with circuits of an extremely simple nature.

Figure 2:
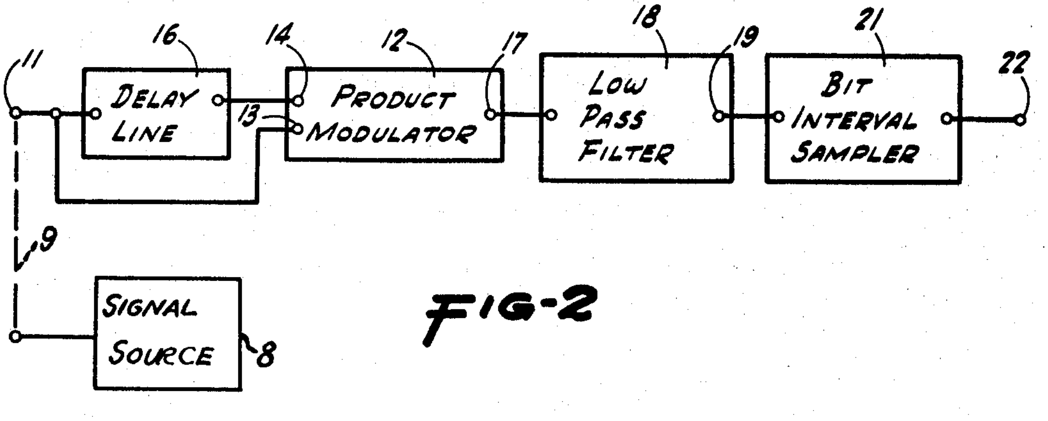

Additional objects and advantages of the invention will become apparent upon consideration of the following description taken in conjunction with the accompanying drawing, wherein:

FIGURE 1 is a graphical illustration of various waveshapes representative of the process of coherent demodulation or detection of a synchronous frequency modulated duobinary signal in accordance with the present invention; and FIGURE 2 is a schematic circuit diagram of a system with which the demodulation process may be conducted.

Considering now the invention in some detail with respect to the coherent demodulation process thereof, and referring to FIGURE 1 of the drawing, it is to be noted that a digital waveform A has two discrete amplitude levels $s$ and $m$ which are respectively representative of "space" and "mark" conditions, for example. Waveform A has a bit speed of C bits per second, and therefore a bit time slot of 1/C seconds. The waveform A is the original data which is subsequently encoded and transmitted over a communications medium in the form of a synchronous frequency modulated duobinary wave B, in the manner set forth in detail in my above noted copending application Ser. No. 434,583. In this regard, the wave B is a sideband (either upper or lower) of a frequency modulated wave wherein the carrier frequency, $f_c$, and the bit speed, C, of the digital data are related by the following expression:

$$f_c/C=k/2$$

$k$ being an integer equal to or greater than 2 and indicating the number of half-cycles of carrier per digit. The wave B includes two extreme frequencies $f_1$ and $f_2$, one of which is the carrier frequency $f_c$, depending upon whether the wave is an upper or lower sideband, and a center frequency, $f_s$, given by:

$$f_s=\frac{C}{4}(2k\pm1)=\frac{f_1+f_2}{2}$$

Such a synchronous frequency modulated duobinary signal is so related to the original data A, that the center frequency $f_s$ is indicative of one level, e.g., "space" as shown, while the extreme frequencies $f_1$ and $f_2$ are both indicative of the other level, in this case, "mark." Thus by virtue of the levels of the original data being represented by the three distinguishable frequencies of the synchronous duobinary signal, it has been the usual practice to reconstruct the original data from the frequencies by demodulation, employing a discriminator, axis-crossing detector, or the like. However, as previously noted, with poor signal-to-noise ratio, the original data may be completely mutilated in the distorted frequency information such that the information cannot be coherently recovered.

Accordingly, in accordance with the basic aspects of the present invention, characteristics of the synchronous frequency modulated duobinary signal B, other than the frequencies thereof, are employed to detect the original data A in a coherent manner, irrespective of poor signal-to-noise ratio. More particularly, it is to be noted that the signal B has four distinct phases at the transition points between time slots. The two extreme frequencies $f_1$ and $f_2$ are always such that one extreme, e.g., $f_1$, has an even number of half-cycles per bit, and the other extreme, e.g., $f_2$, has an odd number of half-cycles per bit. The center frequency, $f_s$, has an odd number of quarter-cycles per bit. Hence, the four possible phase conditions at the transition points are:

(1) Even number of half-cycles followed by center frequency—phases differ by 0°;

(2) Even preceded by center—phases differ by 90°, and magnitude even greater than that of center;

(3) Odd followed by center—phases differ by 180°;

(4) Odd preceded by center—phases differ by 90°, and magnitude of odd less than that of center.

Three other conditions may occur for successive time slots, namely, (5) even followed by even; (6) odd followed by odd, and (7) center followed by center. It can be shown, in a manner subsequently described that conditions 5 and 6 are representative of one discrete level of the original data A, for example, "mark", while condition 7 is representative of the other discrete level, in this case "space." The phase transition conditions 1–4 are representative of transitions in the original data from one discrete level to the other. More particularly, by virtue of the phase conditions of successive time slots of the signal B, the product of each digit (time slot of the signal) and its preceding digit is productive of a waveform which upon appropriate filtering is representative of the original data A. In this regard, consider the waveform B and the same waveform D delayed by one bit interval or digit $1/C$. In any given interval the respective waveforms thus correspond to a given digit and the preceding digit. The product of the waveforms B and D may be considered on the basis of each individual set corresponding digits thereof. First consider conditions 5–7. An extreme even frequency component when multiplied by itself results in a product comprised of a constant $+\frac{1}{2}$ level signal and an AC term of twice the frequency of the even frequency component, i.e., twice $f_1$. An extreme odd frequency component when multiplied by itself results in a product comprised of a constant $-\frac{1}{2}$ level signal and an AC term of twice the frequency of the odd frequency component, i.e., twice $f_2$. A center frequency component when multiplied by itself results in a product of zero and an AC term of twice the center frequency, i.e., twice $f_s$. It will be appreciated that the double frequency terms in the products may be readily eliminated by filtering. Preferably, components of the product signal having frequencies above a cut-off frequency of $C/2$ are eliminated. The double frequency terms have frequencies substantially greater than this cut-off frequency and are thus eliminated.

Considering now the phase transition conditions 1–4, it is to be noted that the products of the corresponding digits of waveforms B and D typifying these conditions are comprised of sine or cosine terms at a frequency equal to the difference between the center and extreme frequencies and sine or cosine terms at frequencies equal to the sums of center and extreme frequencies. The sum frequency terms are substantially higher than the filtering cut-off frequency, $C/2$, and are thus eliminated from the product signal. The difference frequency terms have a frequency equal to ¼ the bit speed C such that quarter-cycles of these terms extend over one digit or bit interval. Moreover, the difference frequency terms have coefficients of $\pm\frac{1}{2}$. Thus, the filtered products of digits under the phase transition conditions 1–4, are quarter-cycles of sine or cosine waves varying between the 0 and $\pm\frac{1}{2}$ levels produced under conditions 5–7. More particularly, condition 1 (even followed by center frequency) results in a filtered product term of $+\frac{1}{2}\cos\Delta t$, $\Delta t$ being the difference between the center and extreme frequencies. For a bit interval $1/C$ this will be recognized as a sinusoidal quarter-cycle falling from $+\frac{1}{2}$ to zero. Condition 2 (even preceded by center frequency) results in a filtered product term of $+\frac{1}{2}\sin\Delta t$, which for a digit time slot is a sinusoidal quarter-cycle rising from zero to $+\frac{1}{2}$. Condition 3 (odd followed by center frequency) results in a filtered product term of $-\frac{1}{2}\cos\Delta t$. That is a sinusoidal quarter-cycle rising from $-\frac{1}{2}$ to zero in a digit time slot. Finally, the filtered product term $-\frac{1}{2}\sin\Delta t$ results from condition 4 (odd preceded by center frequency), which for a single time slot is a quarter-cycle sinusoidal wave falling from zero to $-\frac{1}{2}$.

In accordance with the foregoing, a filtered product signal E is produced from signal B and delayed signal D. The signal E varies between levels of zero and $\pm\frac{1}{2}$ in a manner which is representative of the original data A. The filtered products arising from the various conditions 1–7 are indicated by corresponding numerals applied to signal E in FIGURE 1. It is particularly important to note that the original data A may be derived by sampling waveform E at successive bit intervals $1/C$ as indicated by the arrows F in FIGURE 1. The signal level sampled at these bit intervals is either zero or $\pm\frac{1}{2}$. Zero level is, in the instant case, representative of the "space" level of the original data A, while the $\pm\frac{1}{2}$ levels are both representative of the "mark" level of the original data. Thus, a demodulated signal G results from sampling the signal E at successive bit intervals and this signal will be seen to correspond to the original data A.

The coherent demodulation process described hereinbefore may be conducted by various circuit arrangements of an extremely simple nature. A preferred circuit of this type is illustrated in FIGURE 2 which includes an input terminal 11 for receiving a synchronous frequency modulated single sideband duobinary signal, such as signal B, from a signal source 8 through a communications medium 9. This source produces a signal of the type described above. A product modulator or multiplier 12 is provided with a first input terminal 13 directly connected to terminal 11 and a second input terminal 14 coupled to terminal 11 through a delay line 16 or equivalent time delay element. The delay line is arranged to produce a time delay of one time slot or bit interval of the original data A encoded in the incoming synchronous frequency modulated signal B, i.e., a time delay of $1/C$. Thus, the signals appearing at the input terminals 13 and 14 of the product modulator 12 are respectively the synchronous frequency modulated signal and this signal delayed by one bit interval, i.e., signals B and D of the example illustrated in FIGURE 1. The product modulator multiplies the signals at input terminals 13 and 14 to produce a product signal at an output terminal 17. The product signal is essentialy each digit or bit interval multiplied by the preceding digit or bit interval The output of the product modulator 12 is in turn coupled to a low-pass filter 18 having a cut-off frequency preferably of the order of half the bit rate of the original data A, i.e., $C/2$ c.p.s. High-frequency components of the product signal at the output of the product modulator 12 are thus eliminated by the filter. The filtered product signal appearing at the output 19 of filter 18 is thus of the form previously described, e.g., signal E of FIGURE 1, and is representative of the original data A. The filter output 19 is coupled to a bit interval sampler 21 which is arranged to sample the filtered product signal at successive bit intervals and thereby produce at an output terminal 22 the signal G, for example, which corresponds to the original data A.

Although the invention has been described hereinbefore with respect to specific steps in the method and a single preferred embodiment of the apparatus thereof, no limitations are intended nor to be implied therefrom, reference being made to the appended claims for a precise delineation of the true spirit and scope of the invention.

What is claimed is:

1. A method of coherently demodulating synchronous frequency modulated duobinary signals of the type having two extreme frequencies with both indicative of a first discrete level of an encoded digital signal and a center frequency midway between said extreme frequencies indicative of a second discrete level of the digital signal, one of said extreme frequencies being a carrier synchronized with each digit of said digital signal, comprising the steps of multiplying the signal in each bit interval of said duobinary signal by the signal of the preceding bit interval of said duobinary signal to produce a product signal, and filtering high-frequency components from said product signal to produce a filtered product signal varying between zero and positive and negative levels, said filtered product signal at successive ones of said bit intervals having a zero level or one of said positive or negative levels with said zero level representing said first discrete level of said digital signal and said positive and negative levels representing said second discrete level.

2. A method of demodulating a synchronous frequency modulated duobinary signal of the type having first and second extreme frequencies and a center frequency midway therebetween, said extreme frequencies being both representative of a first discrete level of an encoded digital signal, said central frequency being representative of a second discrete level of said digital signal, one of said extreme frequencies being a carrier synchronized with the bit intervals of said digital signal, one of said extreme frequencies having an odd number of half-cycles for each bit interval of said digital signal, the second of said extreme frequencies having an even number of half-cycles for each bit interval of said digital signal, said center frequency having an odd number of quarter-cycles for each bit interval of said digital signal, comprising multiplying each bit interval of said duobinary signal by the signal in the preceding bit interval to produce a product signal and filtering high-frequency components from the product signal to provide a filtered product signal which for each bit interval of the duobinary signal is characterized by:

(a) a constant positive level for an even number of half-cycles of said second extreme frequency preceded by an even number of half-cycles of said second extreme frequency, (b) a constant negative level for an odd number of half-cycles of said first extreme frequency preceded by an odd number of half-cycles of said first extreme frequency, (c) a constant zero level for an odd number of quarter-cycles of said center frequency preceded by an odd number of quarter-cycles of said center frequency, (d) a quarter-cycle of a sine wave rising from zero to said positive level for an even number of half-cycles of said second extreme frequency preceded by an odd number of quarter-cycles of said center frequency, (e) a quarter-cycle of a sine wave falling from said positive level to zero for an odd number of quarter-cycles of said center frequency preceded by an even number of half-cycles of said second extreme frequency, (f) a quarter-cycle of a sine wave rising from said negative level to zero for an odd number of quarter-cycles of said center frequency preceded by an odd number of half-cycles of said first frequency, and (g) a quarter-cycle of a sine wave falling from zero to said negative level for an odd number of half-cycles of said first frequency preceded by an odd number of quarter-cycles of said center frequency, and observing the level of said filtered product signal at successive bit interval points thereof as an indication of said digital level, said zero level of said filtered product signal being representative of one of said discrete levels of said digital signal and said positive and negative levels of said filtered product signal being both representative of the other discrete level of said digital signal.

3. A method of demodulating a synchronous frequency modulated duobinary signal of the type having first and second extreme frequencies $f_1$ and $f_2$ and a center frequency $f_s$ midway therebetween, said extreme frequencies being both representative of a first discrete level of an encoded digital signal having a bit speed of C bits per second and a bit interval of 1/C second, said center frequency being representative of a second discrete level of said digital signal, one of said extreme frequencies $f_1$ being a carrier related to the bit speed, C, by the expression: $f_1/C=k/2$, where $k$ is the integer equal to or greater than 2, said center frequency $f_s$ being given by:

$$f_s=\frac{C}{4}(2k\pm 1)$$

comprising multiplying intervals of said duobinary signal corresponding to said bit intervals 1/C by immediately preceding ones of said intervals of said duobinary signal to produce a product signal, filtering components from said product signal having frequencies greater than C/2 cycles per second to produce a filtered product signal, and observing levels of said filtered product signal as an indication of said digital signal.

4. A data transmission system comprising a signal source producing a synchronous frequency modulated duobinary signal of the type having two extreme frequencies with both indicative of a first discrete level of an encoded digital signal having a predetermined bit interval and a center frequency midway between said extreme frequencies indicative of a second discrete level of the digital signal, one of said extreme frequencies being a carrier synchronized with each bit of said digital signal, means for receiving and multiplying said duobinary signal by an identical duobinary signal delayed by said predetermined bit interval to produce product signal, and filtering means receiving said product signal and having an upper cut-off frequency of one-half the bit speed of the digital signal for filtering high-frequency components from said product signal to produce a filtered product signal having positive and negative levels both representative of one of said discrete levels of said digital signal and a zero level representative of the other of said discrete levels of said digital signal.

5. A system according to claim 4, further defined by means for sampling said filtered product signal at successive points spaced by said bit intervals.

6. A system for demodulating a synchronous frequency modulated duobinary signal of the type having two extreme frequencies both indicative of a first discrete level of an encoded digital signal having a predetermined bit interval and a center frequency midway between said extreme frequencies indicative of a second discrete level of the digital signal, one of said extreme frequencies being a carrier synchronized with each bit of said digital signal, comprising input means for receiving said duobinary signal, a product modulator having first and second inputs and an output, said modulator producing a signal at said output proportional to signals applied to said first and second inputs, said first input connected to said input means, time delay means connecting said input means to said second input, said time delay means having a delay equal to said bit interval, and a low-pass filter connected to said output of said modulator.

7. A system according to claim 6, further defined by bit interval sampling means connected to said filter for sampling the signal therefrom at increments separated by said bit intervals.

8. A system according to claim 6, further defined by said filter having a cut-off frequency equal to one-half the bit speed of said digital signal.

References Cited

UNITED STATES PATENTS

| | | | |
|---|---|---|---|
| 2,580,148 | 12/1951 | Wirkler | 329—145 X |
| 3,022,461 | 2/1962 | Wilcox | 329—145 X |

ALFRED L. BRODY, *Primary Examiner.*